Dec. 2, 1969 P. L. SCHLUTTIG 3,481,311
COLLAPSIBLE PET CARRIER
Filed July 18, 1967 3 Sheets-Sheet 1

INVENTOR.
Pearl L. Schluttig

Dec. 2, 1969 P. L. SCHLUTTIG 3,481,311
COLLAPSIBLE PET CARRIER
Filed July 18, 1967 3 Sheets-Sheet 2
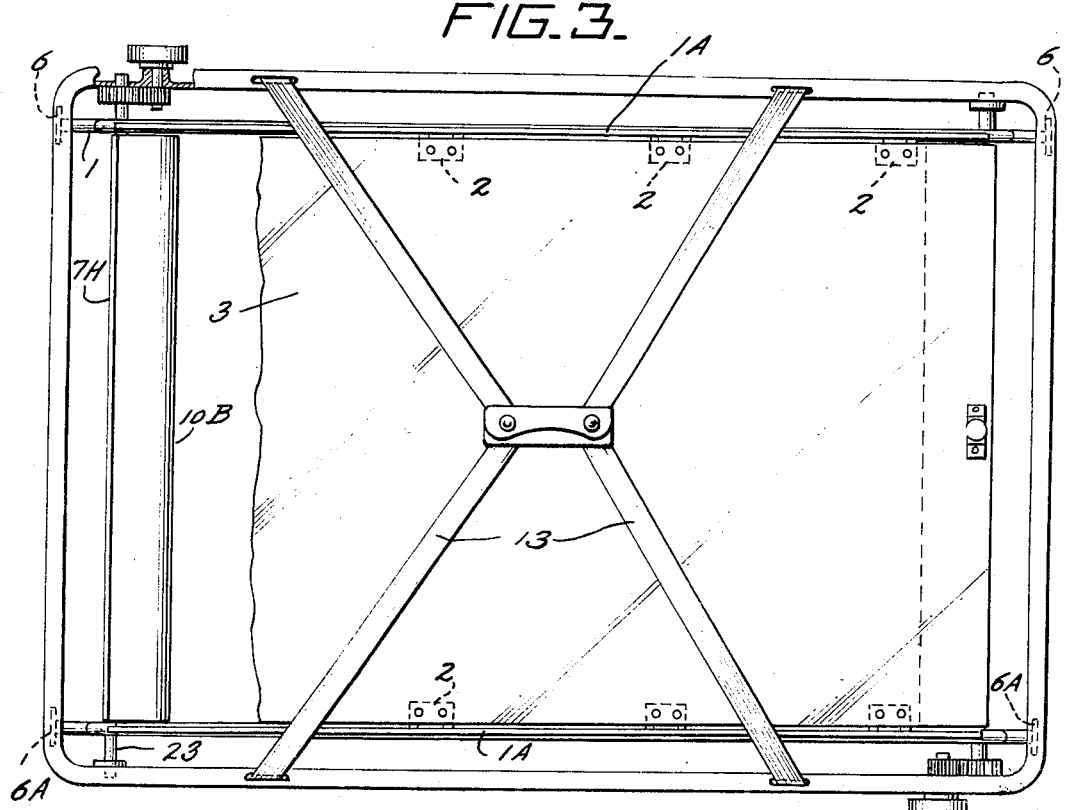
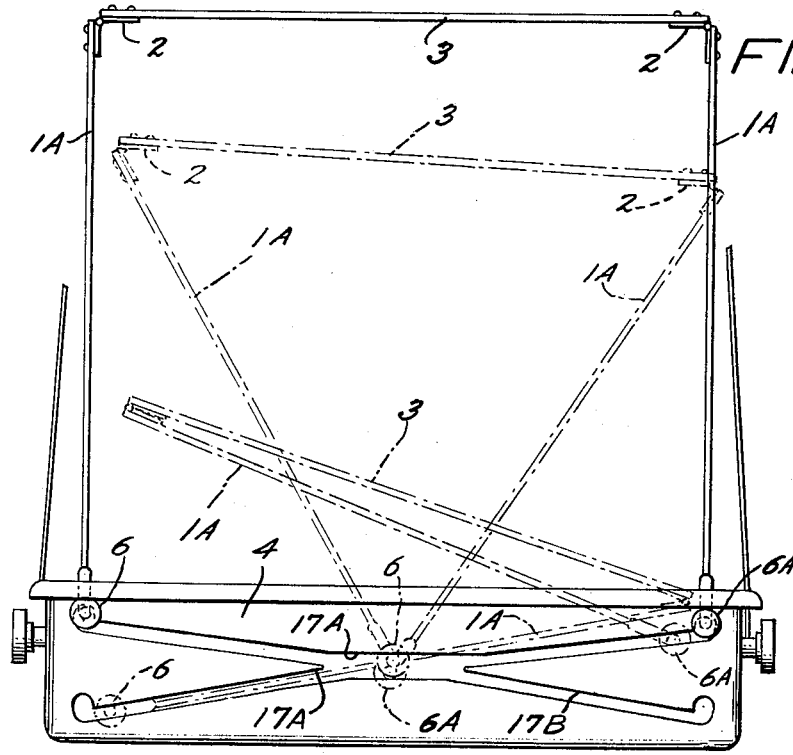
Inventor
Pearl L. Schluttig

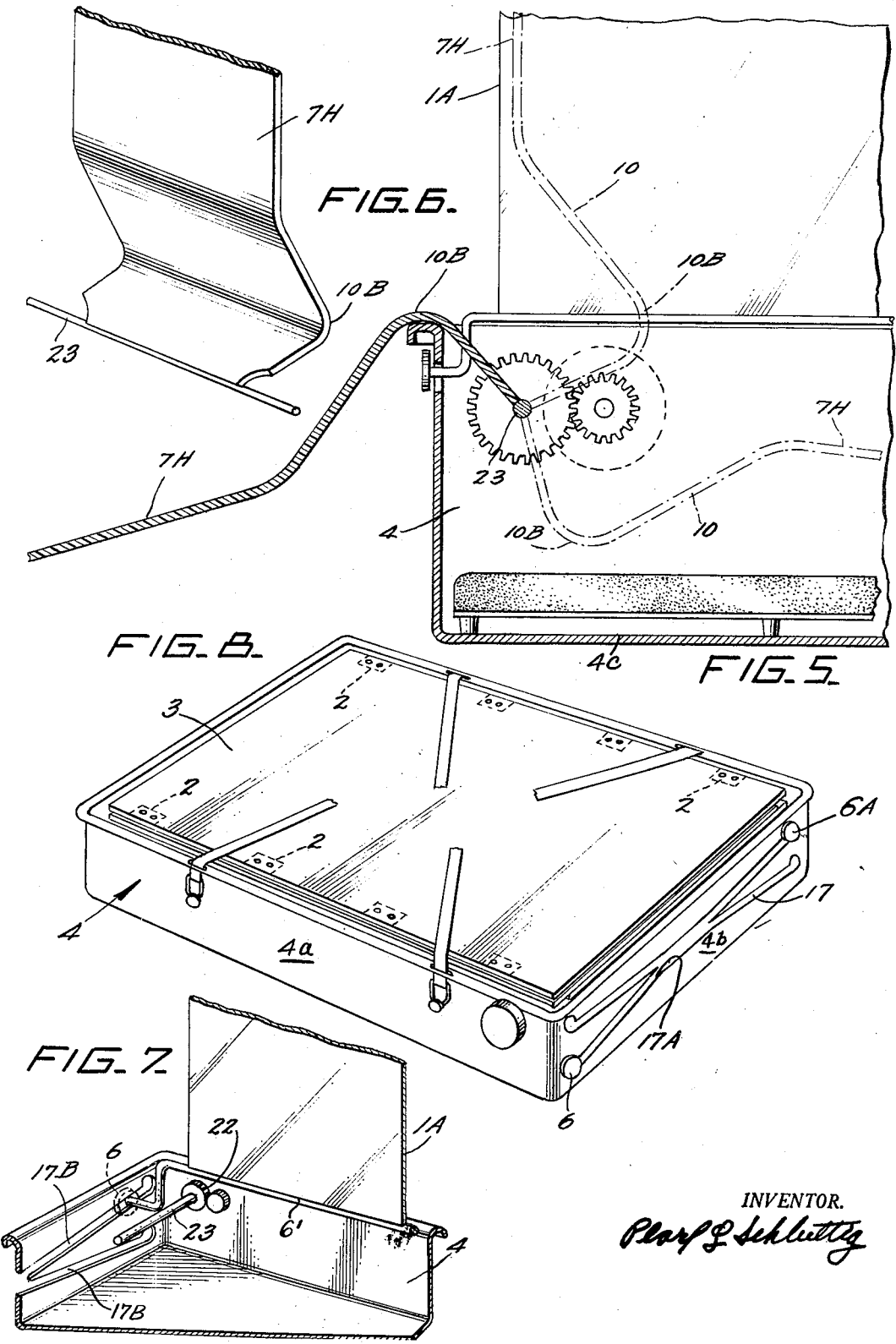

United States Patent Office 3,481,311
Patented Dec. 2, 1969

3,481,311
COLLAPSIBLE PET CARRIER
Pearl L. Schluttig, Washington, D.C.
Filed July 18, 1967, Ser. No. 654,135
Int. Cl. A01k 1/00
U.S. Cl. 119—19      3 Claims

ABSTRACT OF THE DISCLOSURE

The present invention relates to a collapsible pet carrier which can readily be converted into a compact unit for storage purposes. The carrier is so constructed that side and top wall members thereof can be folded to a collapsed position, and so that, in normal use, it permits one of the doors to function as a ramp to the carrier.

---

The present invention relates generally to a collapsible pet carrier, and, in particular, to a pet carrier which can be folded into a compact unit when not in use or for storage, and which can be readily erected when desired, for use in transporting small animals such as dogs and cats.

The carrier of the present invention is especially useful in public transportation travel since it can contain and accommodate the pet in a minimum of space, while still giving the pet adequate comfort. Moreover, since the carrier can be easily erected and collapsed, it can be used in erected condition and/or merely carried in collapsed condition depending on the desires of the user under particular conditions.

One of the primary objects of the present invention is to provide a collapsible pet carrier unit which has a novel structural arrangement of component parts that cooperate to permit the unit to be easily converted from an erected condition into a compact unit for storage purposes. In this regard, it is a further object hereof to provide a guide channel and guide means system in the unit which permits the easy conversion.

A still further object of the invention is to provide a pet carrier which is so arranged and constructed that the possibility of physical injury to the animal is reduced to a minimum and in which the health of the animal will not be jeopardized by undesirable drafts and/or moisture.

An additional object of the invention is to provide a collapsible pet carrier unit conforming with the preceding objects and wherein an end wall element takes the form of a door so supported that the door can function as an incoming ramp to the pet carrier.

Briefly, the collapsible pet carrier unit of the present invention comprises a base frame means, a pair of side wall panels, a top wall panel, and means hingedly connecting the top edges of each side wall panel to opposed edges of said top wall panel. The base frame means has elongated guide tracks therein, and guide means are carried on each of the side wall panels which cooperate with the guide tracks to mount the lower ends of the side wall panels for movement. The side wall panels can thus be moved from a position where they extend upwardly from the base frame means in spaced apart relation with the top wall panel therebetween in covering relation to the base frame means to a position where the side wall panels are disposed within the base frame means. A pair of opposed door panels are incorporated and door mounting means cooperate with opposed side walls of said base frame means to mounting said door panels for swinging movement from a position where they extend upwardly from the base frame means to a position where they are disposed at least substantially parallel to the bottom wall of the base frame means.

The invention will be better understood, and objects other than those set forth above will become apparent, when consideration is given to the following detailed description. Such description makes reference to the annexed drawings presenting preferred illustrative embodiments of the invention, and wherein:

FIGURE 3 is a top plan view, partially broken away and partially in section, of the pet carrier shown in FIGURE 1.

FIGURE 4 is an end view, similar to FIGURE 2, but with door means of the pet carrier removed, FIGURE 4 showing in dotted line positions of wall panels of the pet carrier during collapsing thereof.

FIGURE 5 is a fragmentary view, partially in section, of one end portion of the pet carrier shown in FIGURE 1, FIGURE 5 presenting in particular the details of a preferred gear arrangement used in the pet carrier and also the preferred arrangement of a base pad used in the pet carrier.

FIGURE 6 is a fragmentary perspective view of a door panel and cooperating support used in the pet carrier of FIGURE 1.

FIGURE 7 is a fragmental elevation view of a corner section of the pet carrier of FIGURE 1, FIGURE 7 illustrating the preferred door support and gear arrangement utilized in a pet carrier constructed in accordance herewith; and, FIGURE 8 is a perspective view of the pet carrier shown in FIGURE 1 in a collapsed folded condition for storage and portability.

Figure 1:
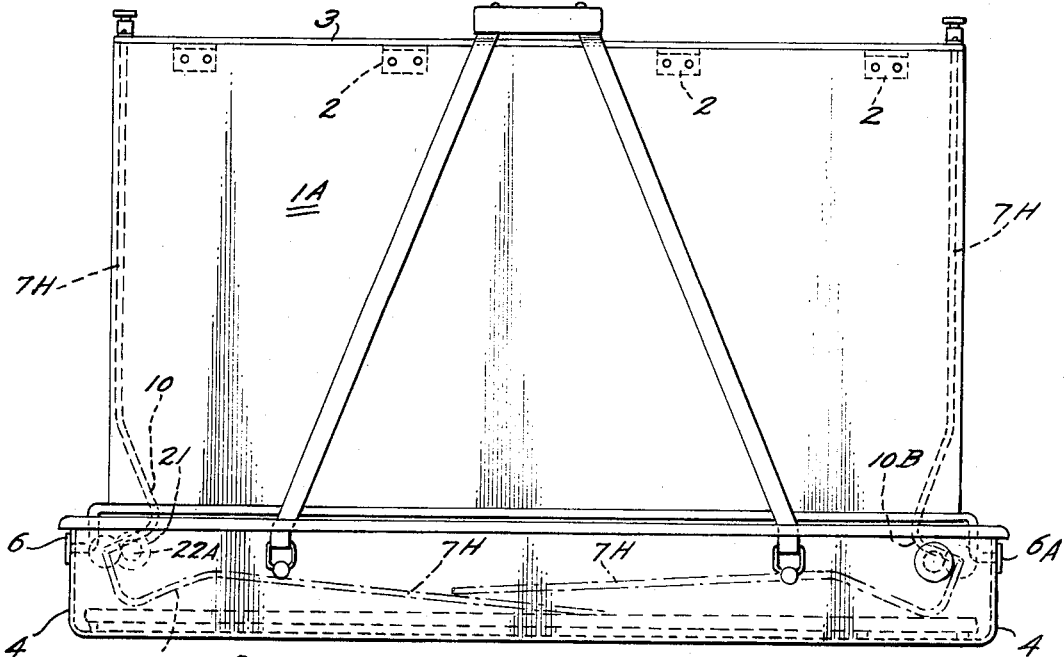
FIGURE 1 is a side view of a pet carrier constructed in accordance with the present invention.

Referring now more specifically to the drawings, the collapsible container of the present invention as shown in FIGURE 4 comprises a base frame means 4 having opposed end walls 4b, opposed side walls 4a, and a bottom wall 4c, preferably in the form of a pan. A pair of opposed side wall panels 1A—1A, and a top wall panel 3 cooperate with the base frame means 4. The top edge of each side wall panel is connected by means of a hinge 2 to the opposed edge of the top wall panel. Each side wall panel carries a guide rod 6' which cooperates with elongated guide tracks 17A–17B. The guide rods have enlarged heads 6 at the outer end thereof, and these rods with such heads serve as guide means for the respective side wall panels. A pair of door panels 7H are utilized at opposite ends of the base frame means; these door panels each carry a support rod 23 which cooperates with a rotatably mounted gear 22 to pivotally mount the door panel. The door panel can thus function as an incoming ramp to the pet carrier, in a preferred embodiment of the invention.

Figure 2:
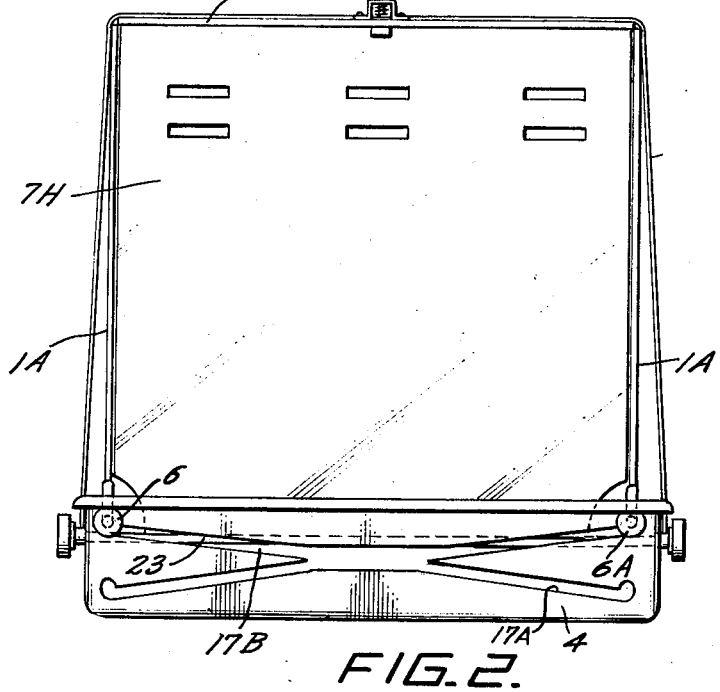
FIGURE 2 is an end view of the pet carrier shown in FIGURE 1.

In the preferred embodiment of the invention, the guide tracks are formed as slots in the end walls 4b of the base frame means 4. Such slots provide first and second elongated guide channels 17A–17B extending in crossed relation to one another. Cooperating with such slots are the side wall panel guide means, namely, first and second rod members 6 secured respectively to the lower portion of the wall panels 1A—1A. The first rod member 6 cooperating with the first guide channels 17A in respectively opposite end walls 4b of the base frame means 4 and the second rod member 6 cooperates with the second guide channels 17B in respectively opposite end walls 4b of said base frame means, as shown in FIGURES 2, 4, and 8. While only one end wall 4b is shown in each of such figures, it will be understood that the opposite end wall is of a corresponding construction to the end wall 4b which is shown.

In another preferred embodiment of this invention, a particular type of door mounting means is incorporated for mounting at least one of the door panels 10. This mounting means includes a shaft 23 carried on the lower portion of the one door panel 7H and projecting from opposite sides thereof. The shaft is mounted for rotation between opposed side walls of said base frame means 4 parallel to and near the adjacent end wall 4b, but inwardly thereof. The door panel has a bent portion 10B towards the base thereof. Due to the provision of such mounting means and the provision of the bent portion in the door panel, the door panel is swingable over the adjacent end wall 4b of the base frame means 4 with the bent portion covering said end wall, whereby the door panel when so disposed defines a ramp into the pet carrier as shown in FIGURES 5 and 6.

It is believed that it will be readily apparent from the foregoing description that the collapsible pet carrier previously described accomplishes the objects as set forth at the beginning of the description. Accordingly,

What is claimed is:

1. A collapsible pet carrier unit comprising:
   (a) base frame means having a bottom wall, opposed side walls and opposed end walls defining a pan,
   (b) a pair of opposed side wall panels,
   (c) a top wall panel,
   (d) means hingedly connecting the top edges of said side wall panels to opposed edges of said top wall panel,
   (e) each of said end walls of said base frame means having elongated guide tracks therein,
   (f) guide means carried on each of said side wall panels, said guide means cooperating with said guide tracks in said end walls of said base frame means to mount the lower ends of said side wall panels for movement of said side wall panels from a position where said side wall panels extend upwardly from said base frame means in spaced apart relation with said top wall panel therebetween in covering relation to said pan, to a position where said side wall panels are disposed at least substantially parallel to said bottom wall of said base frame means and within the pan defined thereby with said top wall panel disposed therebetween,
   (g) a pair of opposed door panels,
   (h) door mounting means cooperating with opposed side walls of said base frame means for mounting said door panels adjacent said opposed end walls of said base frame means for swinging movement of said door panels from a position where said door panels extend upwardly from said base frame means to a position where said door panels are disposed at least substantially parallel to said bottom wall of said base frame means and within the pan defined thereby.

2. A collapsible pet carrier as defined in claim 1, wherein said guide tracks in said end walls comprise first and second elongated guide channels extending in crossed relation to one another and wherein said guide means comprise first and second rod members secured respectively to the lower portion of said side wall panels, said first rod member cooperating with said first guide channels in respectively opposite end walls of said base frame means and said second rod member cooperating with said second guide channels in respectively opposite end walls of said base frame means.

3. A collapsible pet carrier as defined in claim 2, wherein the door mounting means cooperating with opposed side walls for mounting at least one of said door panels comprises a shaft carried on the lower portion of said one door panel and projecting from opposite sides thereof, said shaft being mounted for rotation between opposed side walls of said base frame means parallel to and near the adjacent end wall, but inwardly thereof, and wherein said one door panel has a bent portion toward the base thereof, said one door panel being swingable over the adjacent end wall of said base frame means with said bent portion covering said end wall, whereby said one door panel when so disposed, defines a ramp into said pet carrier.

References Cited
UNITED STATES PATENTS

| | | | |
|---|---|---|---|
| 335,119 | 2/1886 | Flint | 220—6 |
| 844,955 | 2/1907 | Morgan | 220—8 |
| 1,091,391 | 3/1914 | Romans | 217—15 |
| 1,502,252 | 7/1924 | Klug | 217—47 |
| 1,558,545 | 10/1925 | Hoyle | 119—19 |
| 2,529,893 | 11/1950 | Albert | 119—19 |
| 3,048,147 | 8/1962 | McKean | 119—19 |
| 3,195,506 | 7/1965 | Beard | 119—19 |
| 3,280,796 | 10/1966 | Hatcher | 119—19 |

ALDRICH F. MEDBERY, Primary Examiner

U.S. Cl. X.R.

220—6